US011824827B1

(12) United States Patent
Salour et al.

(10) Patent No.: US 11,824,827 B1
(45) Date of Patent: Nov. 21, 2023

(54) REGION-BASED NETWORK ADDRESS TRANSLATION

(71) Applicant: 8x8, Inc., Campbell, CA (US)

(72) Inventors: Mehdi Salour, Campbell, CA (US); Raghu Rengarajan, Campbell, CA (US)

(73) Assignee: 8x8, Inc., Campbell, CA (US)

( * ) Notice: Subject to any disclaimer, the term of this patent is extended or adjusted under 35 U.S.C. 154(b) by 0 days.

(21) Appl. No.: 17/896,275

(22) Filed: Aug. 26, 2022

Related U.S. Application Data

(62) Division of application No. 15/098,058, filed on Apr. 13, 2016, now abandoned.

(51) Int. Cl.
*H04L 61/256* (2022.01)
*H04L 101/668* (2022.01)

(52) U.S. Cl.
CPC ...... *H04L 61/256* (2013.01); *H04L 2101/668* (2022.05)

(58) Field of Classification Search
CPC .................................................. H04L 61/256
See application file for complete search history.

(56) References Cited

U.S. PATENT DOCUMENTS

| 7,224,774 | B1 | 5/2007 | Brown et al. |
| 7,826,602 | B1 | 11/2010 | Hunyady et al. |
| 8,228,861 | B1 | 7/2012 | Nix |
| 8,280,998 | B2 | 10/2012 | Joshi |
| 8,401,003 | B1 | 3/2013 | Petit-Huguenin et al. |
| 8,422,986 | B1 | 4/2013 | Martin et al. |
| 8,606,884 | B2 | 12/2013 | Kim |
| 8,879,540 | B1 | 11/2014 | Martin et al. |
| 9,116,223 | B1 | 8/2015 | Martin et al. |
| 9,203,652 | B2 | 12/2015 | Petit-Huguenin |

(Continued)

OTHER PUBLICATIONS

International Telecommunications Union, Series P: Telephone Transmission Quality, Telephone Installations, Local Line Networks, ITU-T Recommendation p. 862, "Perceptual evaluation of speech quality (PESQ): An objective method for end-to-end speech quality assessment of narrow-band telephone networks and speech codecs," Feb. 2001.

(Continued)

*Primary Examiner* — Ryan J Jakovac
(74) *Attorney, Agent, or Firm* — Crawford Maunu PLLC

(57) ABSTRACT

Apparatus and methods are disclosed for geographic region-based network address translation (NAT) between a public network and a private network having a plurality of defined geographic regions. In some embodiments, region-based NAT may assist to reduce latency, enhance quality, enhance security, and/or improve efficiency of network communications. In response to a data packet from a first port of a private IP address, of an endpoint in the private network, a region of the private network that includes an endpoint identified by the private IP address is determined. A public IP address is selected that is mapped to the determined region in the database. An available port of the selected public IP address is assigned for NAT. NAT is performed for data communicated between the public and private networks using a mapping of the first port of the first IP address to the second port of the second IP address.

24 Claims, 4 Drawing Sheets

(56) References Cited

U.S. PATENT DOCUMENTS

| | | | |
|---|---|---|---|
| 9,247,389 | B2 | 1/2016 | Martin et al. |
| 9,473,452 | B1 | 10/2016 | Judge et al. |
| 9,912,636 | B1 | 3/2018 | Liu |
| 9,979,780 | B1* | 5/2018 | Faibish .............. H04L 67/1097 |
| 10,637,824 | B1 | 4/2020 | Liu |
| 11,184,320 | B1 | 11/2021 | Liu |
| 2003/0058839 | A1 | 3/2003 | D'Souza |
| 2004/0005886 | A1 | 1/2004 | Oda et al. |
| 2004/0032862 | A1 | 2/2004 | Schoeneberger |
| 2004/0120502 | A1 | 6/2004 | Strathmeyer et al. |
| 2005/0083912 | A1 | 4/2005 | Afshar et al. |
| 2006/0083199 | A1 | 4/2006 | Yang |
| 2008/0019268 | A1 | 1/2008 | Rollins |
| 2008/0225865 | A1 | 9/2008 | Herzog |
| 2009/0034493 | A1* | 2/2009 | Malik ................... H04L 61/256 370/338 |
| 2010/0124211 | A1 | 5/2010 | Payyapplly et al. |
| 2010/0135292 | A1 | 6/2010 | Woo et al. |
| 2010/0205313 | A1 | 8/2010 | Boire-Lavigne |
| 2010/0208648 | A1* | 8/2010 | Narkar .................... H04L 67/52 455/500 |
| 2012/0042081 | A1 | 2/2012 | Liao et al. |
| 2012/0281685 | A1 | 11/2012 | Kotecha et al. |
| 2013/0297782 | A1 | 11/2013 | Oura et al. |
| 2015/0040238 | A1* | 2/2015 | Sarsa Sarsa ........ H04L 61/2539 726/26 |
| 2015/0319730 | A1 | 11/2015 | Seine |
| 2016/0088099 | A1 | 3/2016 | Crudele et al. |
| 2017/0222922 | A1* | 8/2017 | Zlatokrilov ......... H04L 61/5007 |
| 2017/0264679 | A1* | 9/2017 | Chen ................... H04L 67/1023 |
| 2017/0366449 | A1 | 12/2017 | Loveless |
| 2018/0026877 | A1 | 1/2018 | Mysyk |

OTHER PUBLICATIONS

Radvision, "Back-To-Back User Agent (B2BUA) SIP Servers Powering Next Generation Networks: A Functional and Architectural Look at Back-To-Back User Agent (B2BUA) SIP Servers," 2007.

USPTO. PTAB Decision on Appeal dated Jun. 29, 2022, for the priority parent U.S. Appl. No. 15/098,058, pp. 1-23.

The Examiner is respectfully referred to pending patent prosecution of the common Applicant/Assignee, U.S. Appl. No. 17/521,065, filed Nov. 8, 2021, and its (U.S. Appl. No. 17/521,065) parent patent prosecution which issued as U.S. Pat. No. 9,912,636; U.S. Pat. No. 10,637,824; and U.S. Pat. No. 11,184,320 (said patents also listed above).

* cited by examiner

REGION-BASED NETWORK ADDRESS TRANSLATION

OVERVIEW

The instant disclosure relates generally to communication systems and, more particularly to communication between endpoint devices wide-area-networks (WANs), such as the interne and local area networks (LANs). For ease of reference, endpoint devices are sometimes referred to simply as an "endpoints" and where they are configured with VoIP capability, they are sometimes referred to as a "VoIP endpoint." In many contexts endpoints and VoIP endpoints are (VoIP-capable) telephones commonly used and referred to as IP phones such as used on desktops, mobile (smart) phones, desktop CPU stations, laptops, tablets and the like. For ease of reference, a WAN may be referred to as a public network and a LAN may be referred to as a private network. IP addresses used for identification of endpoint devices in the public network may be referred to as public IP addresses and IP addresses used for identification of endpoint devices in the private network may be referred to as private IP addresses. Public IP addresses are issued by a central authority known as the Internet Assigned Number Authority ("IANA").

Due to the limited number of the currently used IPv4 type IP addresses, there often are not sufficient public IP addresses to uniquely identify all endpoints in a private network. Network address translation ("NAT") is used in many networks to allow multiple endpoints in a private network to be identified on a public network using the same public IP address to communicate data via a single public IP address. For each connection initiated by an endpoint, a NAT pathway is created and maintained by a NAT circuit for a limited period of time. The NAT pathway maps a private IP address and port of the device to an exclusive port of the public IP address. By mapping devices to different virtual ports of the public IP address, multiple endpoints may be uniquely identified by the port:IP address combination—thereby allowing the endpoints in a private network to communicate on the public network using the same public IP address.

Certain portions of the instant disclosure more particularly relate to telephone services as used in the communications industry. The communications industry continues to rely upon advances in technology to realize higher-functioning systems at cost-effective prices. Telephony signals can now be transmitted by methods and systems including traditional public standard telephone networks (PSTNs), Internet telephony service providers (ITSP), packet-based systems, digital wireless systems, analog wireless systems, private branch exchanges (PBX), cable systems, T1 systems, integrated service digital networks (ISDN), and digital subscriber line (DSL) systems, to name a few.

SUMMARY

Various example embodiments are directed to issues such as those addressed above and/or others which may become apparent from the following disclosure concerning network address translation (NAT). In certain embodiments, NAT is performed for data packets communicated between a public network and a private network having endpoints located in a plurality of defined geographic regions. NAT is performed using different sets of public IP addresses for different geographic regions of a private network. In response to a data packet from a first port of a private IP address, used to identify an endpoint in the private network, a geographic region of the private network that includes an endpoint identified by the private IP address is determined. A public IP address is selected from a set of public IP addresses that is mapped to the determined geographic region in the database. An available port of the selected public IP address is assigned for NAT. NAT is performed for data communicated between the public and private networks using a mapping of the first port of the first IP address to the second port of the second IP address.

In another example embodiment, an apparatus is configured to perform NAT for data packets communicated between a public network and a private network having a plurality of defined geographic regions. The apparatus includes a first network interface circuit configured to communicate data over the private network using a first set of IP addresses to identify endpoints, the endpoints being located in a plurality of geographic regions. The apparatus also includes a second network interface configured to communicate data over the public network using a second set of IP addresses to identify the endpoints. A NAT processing circuit is coupled to the first and second interfaces and configured to perform NAT, using respective subsets of the second set of IP addresses specified for the plurality of geographic regions in a database. In response to a data packet from a first port of a first private IP of the first set of private IP addresses, the NAT processing circuit determines in which of the plurality of geographic regions the endpoint identified by the first private IP address is located. The NAT processing circuit selects a second IP address from a subset of the second set of IP addresses specified for the determined geographic region in the database. The NAT processing circuit assigns an available second port of the selected IP address for NAT. The NAT processing circuit performs NAT for data communicated between the public and private networks using a mapping of the first port of the first IP address to the second port of the second IP address.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1:
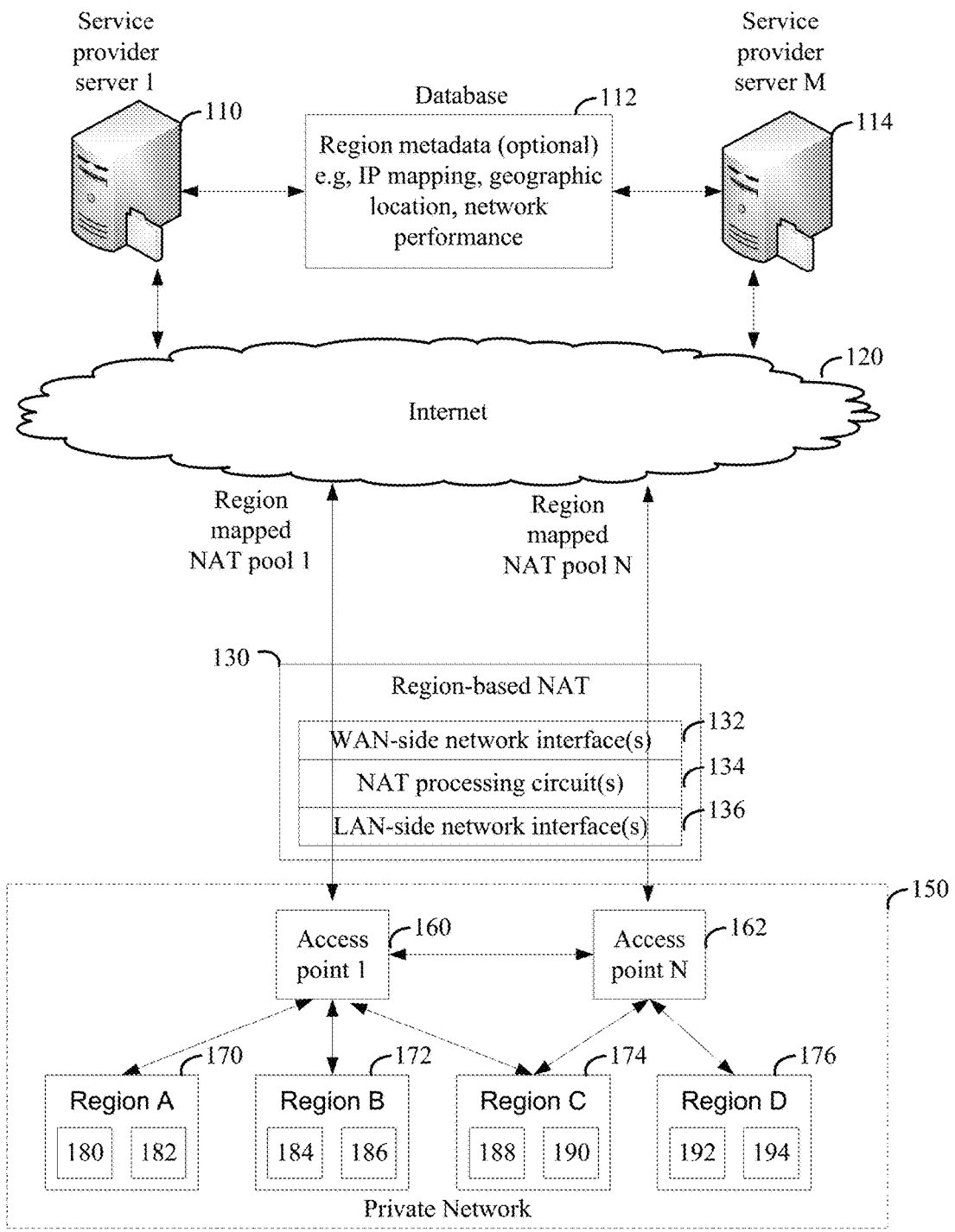
FIG. 1 shows a communication network, configured in accordance with one or more embodiments.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, including systems and/or devices, and methods involving NAT for data network communications. Some example implementations are directed to apparatuses and methods for performing NAT for data communicated between a public network and a private network having endpoints located in a plurality of defined geographic regions. In some various embodiments, NAT is performed using different public IP addresses for different geographic regions in the private network. For ease of reference, NAT performed using different public IP addresses for different geographic regions of a private network may be referred to as region-based NAT. In certain embodiments, aspects of the present disclosure have been shown to be beneficial when used in the context of location-based routing of data in networks. While not necessarily so limited, various aspects may be appreciated through the following discussion of non-limiting examples which use exemplary contexts.

In certain embodiments, a network device is configured to communicate data packets between a public network and a private network using a region-based NAT. In response to a data packet from a first port of a private IP address, used to identify an endpoint in the private network, a geographic region of the private network that includes an endpoint identified by the private IP address is determined. A public IP address is selected from a set of public IP addresses that is mapped to the determined geographic region in the database. An available port of the selected public IP address is assigned for NAT. NAT is performed for data communicated between the public and private networks using a mapping of the first port of the first IP address to the second port of the second IP address.

Accordingly, in the following description, various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure can be combined with features of another figure even though the combination is not explicitly shown or explicitly described as a combination.

Different embodiments may utilize various circuit arrangements to perform region-based NAT. In certain embodiments, a region-based NAT circuit includes a first network interface circuit configured to communicate data over the private network using a set of private IP addresses to identify endpoints in the private network. The region-based NAT circuit also includes a second network interface configured to communicate data over the public network using a set of public IP addresses to identify the endpoints. A NAT processing circuit coupled to the first and second interfaces is configured to perform the region-based NAT using respective subsets of the set of public IP addresses specified for each of the geographic regions in a database.

The processing circuit may perform region-based NAT using various processes. As an illustrative example, the NAT processing circuit may perform region-based NAT by performing operations including:
1) in response to a data packet from a first port of one of the private IPs, determining which of the plurality of geographic regions the endpoint identified by the first private IP address is located;
2) selecting a second IP address from a subset of the second set of IP addresses specified for the determined geographic region in the database;
3) assigning an available second port of the selected IP address for NAT; and
4) performing NAT for data communicated between the public and private networks using a mapping of the first port of the first IP address to the second port of the second IP address.

In some embodiments, the region-based NAT circuit may include additional circuits configured to perform one or more of the above operations. For example, in some embodiments, the region-based NAT circuit may include a region determination circuit configured to determine the geographic region-based on the private source IP address indicated in the data packet. The geographic region may be determined, for example, by looking up the geographic region in a stored table mapping the private IP addresses to the geographic regions. As another example, the region-based NAT circuit may include a mapping circuit configured to determine the subset of public IP addresses to be used for NAT for the determined region. The mapping circuit may determine the subset of public IP addresses, for example, by retrieving the subset of public IP addresses from a database mapping the public IP addresses to the geographic regions in the private network.

In certain embodiments, region-based NAT is used to facilitate location-based routing of data in private networks. In location-based routing, the resources (e.g., network paths and/or data servers) used to provide service to endpoints may be adjusted based on the geographic location of the endpoints. Location-based routing may be used, for example, reducing latency, enhancing quality, and/or improving efficiency in many network applications. Additionally or alternatively location-based routing may be used to enhance security for network communication. For instance, due to political, security, or compliance concerns, the traffic from a specific geographic region might need to be handled in a certain way (through a particular route/data center, etc.).

In a public network, geolocation of an endpoint can be obtained, for example, based on a public IP of the endpoint from IP registration data, IP geolocation services, or various other sources that correlate an IP address with a geolocation. However, it can be difficult to distinguish and determine location of endpoints in a private network after NAT has converted private IP addresses to one or more shared public IP addresses. One or more embodiments utilize region-based routing to facilitate location-based routing in private networks. Region-based NAT allows the geographic location of endpoints in the private network to be identified at a region level based on the public IP used for NAT and communication via the public network. Since region-based routing performs NAT using a different subset of public IPs for each geographic region, a public network device (e.g., a server) may determine the geographic region of a private network endpoint based on the public IP used to identify the endpoint on the public network. The geographic region may be determined from the public IP using, for example, a database that maps each geographic region to the public IPs used for NAT. The IP to geographic region mapping data may be stored in a local database (e.g., in a memory of the public network device) and/or may be stored in a remote database communicatively connected to the device (e.g., via the public network).

After determining the geographic region of the endpoint, a public network server may select resources to provide service to the endpoint based on the determined geographic region. For example, a server may select the network paths for communicating data to the endpoint based on the geographic location of the server and the geographic region of the endpoint. In different implementations, a server may cause data to be routed over the select path using various processes. In some implementations, the server may control routing of data by selecting from a plurality of internet service providers to communicate the data over the public network. Additionally or alternatively, the server may control routing by prepending routing table entries provided to routing nodes connected to the server in the public network. Prepending may cause a routing node to believe a connection between the node and the server includes a larger number of network hops than the actual number of hops. By prepending entries provided to certain routing nodes, data paths used to route data from the endpoint to the server can be manipulated. Conversely, in some embodiments, the server may cause an access point or other device in the private network to prepend routing table entries to manipulate data paths used for routing data from the server to the endpoint.

Additionally or alternatively, in some embodiments, server(s) to be used to provide service for an endpoint may be selected based on the determined geographic region. For instance, a service provider may have multiple servers geographically distributed in a public network for providing service to endpoints. When a service request is received, one of the servers may be selected to provide service to the endpoint based on the determined geographic region of the connected endpoint. For instance, connection requests may initially be received by a load distribution server configured to assign one of the servers to provide the respective service based on the geographic region. In some embodiments, the load distribution server directs the selected server to respond to the service request and provide the requested service to the endpoint. Additionally or alternatively, the load distribution server may direct the requesting endpoint to contact the selected server for service.

The load-distribution server may be incorporated into various devices on the public network. In some embodiments, the load-distribution server may be incorporated with one or more of the servers available for selection. For example, each server may be configured to select one of the servers, based on geographic region, in response to receiving a service request from an endpoint. If the server selects itself, the server communicates with the endpoint to provide the requested service. Otherwise, the server directs the selected server and/or endpoint to cause the selected server to provide the requested service for the endpoint. As another example, in some embodiments, the load-distribution server may be implemented by domain name server (DNS) in the public network. For example, the DNS may be configured to direct an endpoint to contact different ones of the servers by controlling the IP address(es) that is provided in response to a domain name query. In some embodiments, the load-distribution server may select a subset of the servers based on the determined geographic region and direct the endpoint to select and contact a server of the subset for service. The endpoint may select a server from the subset, pseudo randomly, based on weightings provided by the load-distribution server, and/or based on various other criteria (e.g., network performance, available access points, and/or user preferences).

In some embodiments, selection of resources for providing the requested service to the endpoint may additionally or alternatively select one or more nodes in the private network, for communicating data with the endpoint, based on the determined geographic region. For example, endpoints in a particular region of a private network may be able to connect to the public network via multiple access points. For instance, a private network may be connected to the internet by access points for multiple types of connections (e.g., DSL, cable, fiber, and/or satellite) and/or by multiple internet service providers. The access point used for communication between the server and the endpoint may be selected based on various parameters in addition to or in lieu of the geographic region of the endpoint including, for example, geographic location of the endpoint and/or server, transmission characteristics of connections between the access point and the endpoint and/or server (e.g., bandwidth, latency, dropped data packets, BER, and/or traffic load), type of data to be communicated (e.g., text, images, webpage, voice/audio, and/or video), or various combinations thereof. Values of the parameters may be specified for each access point, for example, in the database that maps the geographic regions to the public IP addresses used for network address translation. Alternatively or additionally, the values of the parameters may be retrieved from one or more other data sources including, for example, internet-connected data repositories, and/or third-party data subscription services. If the selected access point is different than the access point used to communicate the service request, the load-distribution server may prompt the endpoint to contact a selected server via the selected access point. Contacting the selected server via the selected access point causes the NAT circuit to assign the endpoint an available port of the public IP address used for NAT for the selected access point.

Resources (e.g., servers, data paths, and/or access points) used to provide a requested service to an endpoint for routing data via public and/or private networks may be selected using various processes. In some embodiments, resources may be selected according to a selection algorithm specified in a configuration settings file. The configuration settings file may be stored locally or in a remote database. The selection algorithm may select resources based on various criteria including geographic region of the endpoints, transmission characteristics in the public and/or private networks (e.g., bandwidth, latency, dropped data packets, and/or BER), traffic load of available access points and/or servers, date, time, or various combinations thereof. The selection algorithm may select resources to improve various operating parameters. For example, resources may be selected to reduce latency by circumventing delays attributable to longer and/or congested data paths on the public and/or private networks, balance load between network resources, and/or improve routing efficiency on geographically diverse private networks.

In some implementations, the algorithms/criteria for selection of resources may be implemented using one or more machine learning algorithms (e.g., an evolutionary algorithm). The machine learning algorithm may be evaluated and adjusted in a training process to improve performance and/or accuracy of the algorithm. Training may include supervised or unsupervised learning. In some embodiments, a settings selection algorithm may be adjusted to use a different weighting of parameters on a trial basis. If the modified settings selection algorithm improves performance in the network(s), the modified settings selection algorithm may replace the current settings selection algorithm. Otherwise, the modified settings selection algorithm may be discarded.

The disclosed embodiments may be adapted to facilitate location-based routing for various types of communication of various types of data. While embodiments are not so limited, for ease of explanation, the examples are primarily described with reference to servers configured to provide VoIP services for endpoints.

In some embodiments, the region-based NAT circuit may include a processing circuit configured to determine data metrics for data routed between the public and private network for each of the geographic regions. The data metrics may be determined, for example, by generating various statistics relating to the quality of the VoIP calls including, for example, types of service provided to the endpoints, data path(s) used for routing of the data, and/or network characteristics of the data path(s) (e.g., bandwidth, latency, dropped data packets, and/or BER), or various combinations thereof. The processing circuit may be configured to generate reports indicating data metrics for individual transactions or sessions of the endpoints, or aggregate data for all activity of the endpoints.

In some embodiments, the processing circuit is configured to perform an analysis of the data metrics. For instance, the processing circuit may evaluate the generated data metrics for a parameter of interest specified in an input query. The input query may request that the processing circuit analyze the data metrics for various parameters of interest. Parameters of interest may include, for example, identifiers for specific ones of the data metrics and/or criteria for identifying subsets of the data metrics. As an illustrative example, an input query may request that the processing circuit filter data metrics to identify metrics common to transactions and/or sessions having a determined quality that is below a threshold specified in the query. After identifying the common metrics, the values may be used as a signature to identify similar calls as they occur. This process may be useful, for example, to determine a signature for detection of data paths that are congested.

As yet another example parameter of interest, the input query may request that a processing circuit identify data metrics that are exhibiting a recent trend in comparison to a historical average value. Trends may be identified, for instance, based on deviation of a value of the data metric in a recent time window from an average calculated from the previous time window. In some implementations, the analysis process may further evaluate identified trends to identify other metrics that exhibit a strong correlation with the identified trend. In some embodiments, a processing circuit is configured to correlate data metrics with data provided from other sources to facilitate further analysis. Other data sources may include, for example, applications utilized by the end-users in the network, internet-connected data repositories, and/or third-party data subscription services. As one example, a presence (or activity) detection circuit may provide data indicating statuses of the end-users to the processing circuit.

In some implementations, the processing circuit may be configured to provide alert messages to one or more users in response to the data metrics or analysis satisfying a set of alert criteria. For example, in some embodiments, the second processing circuit is configured to provide alert messages to one or more users in response to geographic regions becoming unbalanced. For instance, an alert may be provided to a network administrator if the number of users in the defined geographic regions becomes unbalanced. In response, the network administrator may redefine the geographic regions, for example, to divide a large geographic region into multiple smaller geographic regions. An alert may be provided if data metrics indicate that a network resource (e.g., an access point) may be non-functional.

In some embodiments, the processing circuit may additionally or alternatively be configured to provide a graphical user interface (GUI), e.g., a webpage interface, including a mechanism (e.g., button(s), selection menu(s), and/or slider(s)) for the user of the device to define/adjust geographic regions in a private network, an algorithm/criteria for automated assignment of devices to geographic regions and/or mapping geographic regions to the public IP addresses, an algorithm/criteria for selecting communication paths or routing data, and/or criteria for generating alerts.

For ease of explanation, the examples are primarily described with reference to selecting resources when service is initially requested by an endpoint in a private network. However, the embodiments are not so limited. For example, in some implementations, resources may be dynamically selected and/or adjusted while providing service to an endpoint. For instance, a selected server may be configured to monitor various parameters while providing the service to the endpoint. The monitored parameters may include, for example, geographic location of portable endpoints (e.g., wireless connected endpoints) in the private network, transmission characteristics of the data paths in the public and private networks (e.g., bandwidth, latency, dropped data packets, BER), traffic load of the access point and/or servers, type of data to be communicated (e.g., text, images, webpage, voice/audio, and/or video) or various combinations thereof. Responsive to the monitored parameters, the server may select different resources to continue providing service for the endpoint.

Turning now to the figures, FIG. 1 shows a communication network, configured in accordance with one or more embodiments. The communication network includes a plurality of data servers (e.g., VoIP servers) 110 and 114 connected in a public network 120 (e.g., the internet). The data servers are configured to provide one or more services to endpoints connected via one or more networks.

A private network 150 is connected to the public network 120 by a region-based NAT circuit 130. The private network 150 includes a plurality of end-points 180, 182, 184, 186, 188, 190, 192, and 194 distributed across a plurality of geographic regions 170, 172, 174, and 176. The private network 150 includes a set of access points 160 or 162. Each access point communicatively couples endpoint devices in one or more of the geographic regions 170, 172, 174, and 176 to the public network 120. In this example, the private network includes two access points. In this example, the endpoints in the private network 150 are connected to the public network 120 via multiple access points. For instance, endpoint devices in each of the geographic regions 170, 172, 174, and 176 are connected to each of the access points 160 and 162 either directly or indirectly via the other access point. Various embodiments may include more or fewer access points.

The region-based NAT circuit 130 is configured to perform region-based NAT using an exclusive subset of public IP addresses for each respective one of the geographic regions 170, 172, 174, and 176. In this example, the region-based NAT circuit 130 includes a WAN-side network interface circuit 132 configured to communicate data over a public network (e.g., the internet 120) using a set of public IP addresses. The region-based NAT circuit 130 includes a LAN-side network interface circuit 136 configured to communicate data over the private network 150 using a set of private IP addresses. A NAT processing circuit 134 performs NAT on data packets communicated between the network interface circuits 132 and 136 using a different subset of public IP addresses for each of the geographic regions 170, 172, 174, and 176.

By performing NAT using different public IP addresses for different ones of the geographic regions 170, 172, 174, and 176, geographic regions of the endpoints in the private network 150 may be determined by WAN-side devices based on the public IP address used for NAT. As an illustrative example, one or more servers 110 and 114 connected in the public network 120 may determine a geographic region of an endpoint in the private network 150 in response to receiving a connection request data packet from the endpoint. The server (e.g., 110) may determine the geographic region of an endpoint, for example, by looking up a source IP address of the received data packet in a database 112. The database maps the public IP addresses used for NAT to geographic regions 170, 172, 174, and 176 in the private network 150.

In some embodiments, the one or more of the servers 110 and 114 is configured to perform location-based routing using the geographic region determined for the endpoint. For example, after determining the geographic region of the endpoint requesting service, a server (e.g., 110) may select various resources to provide the requested service to the endpoint based on the determined geographic region. In some embodiments, resources are selected by one of the servers available for providing the requested service to the endpoint. Alternatively or additionally, the resources may be selected by a separate server (e.g., a load-distribution server or a DNS).

As previously described, selection of resources may select one of the servers 110 and 114 to provide service to the endpoint, network paths for communicating data to the endpoint, various private network node (e.g., access points 160 and 162), communication settings (transmission protocols, encryption, forward error correction, and/or audio or video codec), or various combinations thereof. The resources may be selected based on the determined geographic region of the requesting endpoint, geographic location of the access point(s) 160 and 162 and/or server(s), 110 and 114, transmission characteristics of the data paths in the public and private networks (e.g., bandwidth, latency, dropped data packets, BER), traffic load of the access point and/or servers, the type of data to be communicated (e.g., text, images, webpage, voice/audio, and/or video), or various combinations thereof.

As an illustrative example, a VoIP service provider may include a plurality of geographically distributed VoIP servers 110 and 114 (e.g., SIP and/or media relay servers) for routing of VoIP calls. When a VoIP server (e.g., 110) receives a service request (e.g., endpoint registration and/or connection request) from a private network endpoint, the VoIP server can determine the geographic region of the registering/calling endpoint (or callee endpoint). Using the geographic regions, the VoIP server 110 can select one of the available VoIP servers 110 and 114 to provide VoIP service for the endpoint, select data paths (e.g., telephone and/or data carriers), and/or select various other resources for connecting to the endpoint as previously described.

Figure 2:
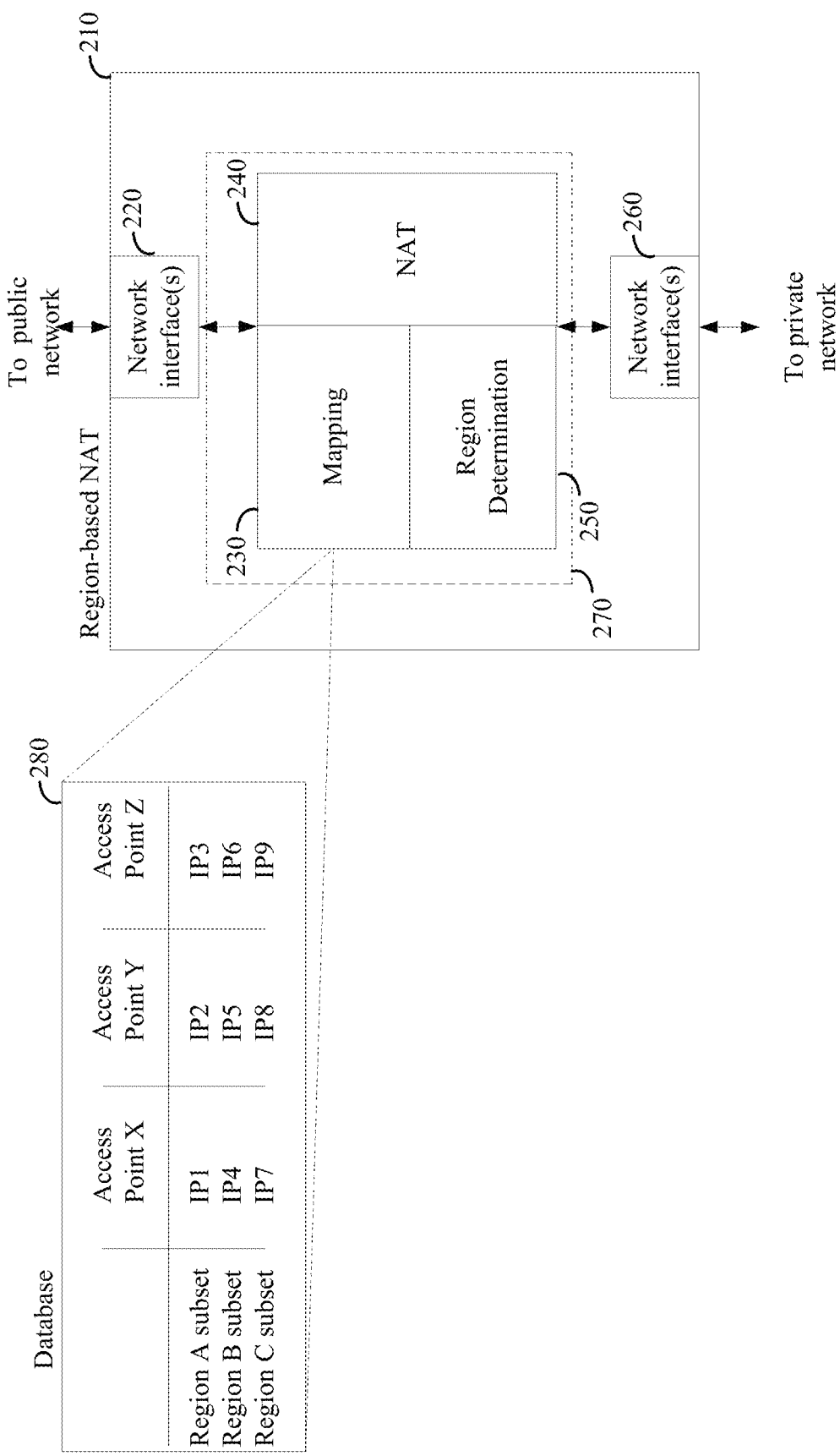
FIG. 2 shows an example circuit for performing region-based NAT, in accordance with one or more embodiments.

FIG. 2 shows an example circuit 210 for performing region-based NAT, in accordance with one or more embodiments. The circuit may be used to implement the region-based NAT circuit 130 shown in FIG. 1. In this example, the circuit 210 includes a first network interface circuit 260 configured to communicate data over the private network using a set of private IP addresses to identify endpoints. The circuit 210 also includes a second network interface 220 configured to communicate data over the public network using a set of public IP addresses to identify the endpoints.

A NAT processing circuit 270 is coupled to the first and second interfaces and configured to perform NAT, using respective subsets of the public IP addresses for plurality of geographic regions in a database 280. In this example, the NAT processing circuit 270 includes a region determination circuit 250, a mapping circuit 230, and a NAT circuit 240. The region determination circuit 250 is configured to determine a geographic region in the private network that includes the endpoint assigned to the first private IP. The geographic region may be determined, for example, by looking up the geographic region in a stored table mapping the private IP addresses to the geographic regions. In some embodiments, the table may be stored locally (e.g., in a non-volatile memory in the region determination circuit 250) or may be retrieved from a remote server communicatively connected to the circuit 210 via the public and/or private networks. The mapping circuit 230 is configured to determine the subset of public IP addresses to be used for NAT for the determined geographic region. The mapping circuit 230 may determine the subset of public IP addresses, for example, by retrieving the subset of public IP addresses from a database 280 mapping the public IP addresses to the geographic regions in the private network.

In response to receiving a data packet, via network interface 260, from a first port of a first private IP, the region determination circuit 250 determines in which of the plurality of geographic regions the endpoint identified by the first private IP address is located. The mapping circuit 230 determines a subset of the second set of IP addresses specified for the determined geographic region in the database 280. NAT circuit 270 selects a second IP address from the determined subset. The NAT circuit 270 assigns an available second port of the selected IP address for NAT. The NAT circuit 270 performs NAT for data communicated between the public and private networks via network interfaces 220 and 260 using a mapping of the first port of the first IP address to the second port of the second IP address.

As previously described, the database 280 specifies respective subsets of public IP addresses for a plurality of geographic regions in a private network. In this example, the database 280 specifies respective subsets of public IP addresses for three geographic regions A, B, and C. In some embodiments, one or more geographic regions may be subdivided into two or more sub-regions. Each sub-region may be assigned a sub-subset of the public IP addresses mapped to the region for exclusive NAT of endpoints in the sub-region. In some embodiments, each subset includes a respective sub-subset of the IP address to be used exclusively for NAT translation of data packets communicated via each of three access points (e.g., X, Y, and Z) in the private network. In some embodiments, the database 280 may specify additional information (e.g., transmission characteristics and/or capabilities) for each region and/or each access point. For each access point, the database may indicate transmission characteristics (e.g. bandwidth and/or latency) for communication between the endpoint and each of the geographic regions. The additional information may be used, for example, to select an access point used for communication between an endpoint and a selected server.

In this example, the database 280 includes a table having the subsets of IP addresses listed as table entries. Additionally or alternatively, in some embodiments, the database may specify the mapping of geographic regions and/or access points to public IP addresses as an algorithmic function. For example, for a private network having two geographic regions, odd IP addresses of the set of public IP addresses for NAT may correspond to a first geographic region of the private network. Even IP addresses of the set may correspond to a second geographic region of the private network. As a more general example, for a private network having N geographic regions, the region mapped to a public IP address used for NAT is given by:

Region=(public IP address for NAT) mod (*N*)

Other functions and/or rulesets may be used to specify the mapping of geographic regions to IP addresses. When the mapping of geographic regions to IP addresses is specified by an algorithmic function, public IP addresses used for NAT may be added or removed (according to the function) without needing to provide an updated mapping to servers in the network.

In some embodiments, the circuit 210 may be configured to implement a network connected database (e.g., 112) providing the servers in the public network (e.g., 110 and 114) access to the database 280. The servers may access the database as needed during operation to determine geographic regions of endpoints in the private network and/or other parameter data. Alternatively or additionally, a copy of the database may be stored in a remote database or at one or more of the servers (e.g., 110 and 114). In some implementations, the circuit 210 may be configured to determine and update parameter values (e.g., transmission characteristics) during operation of the public and private networks.

Figure 3:
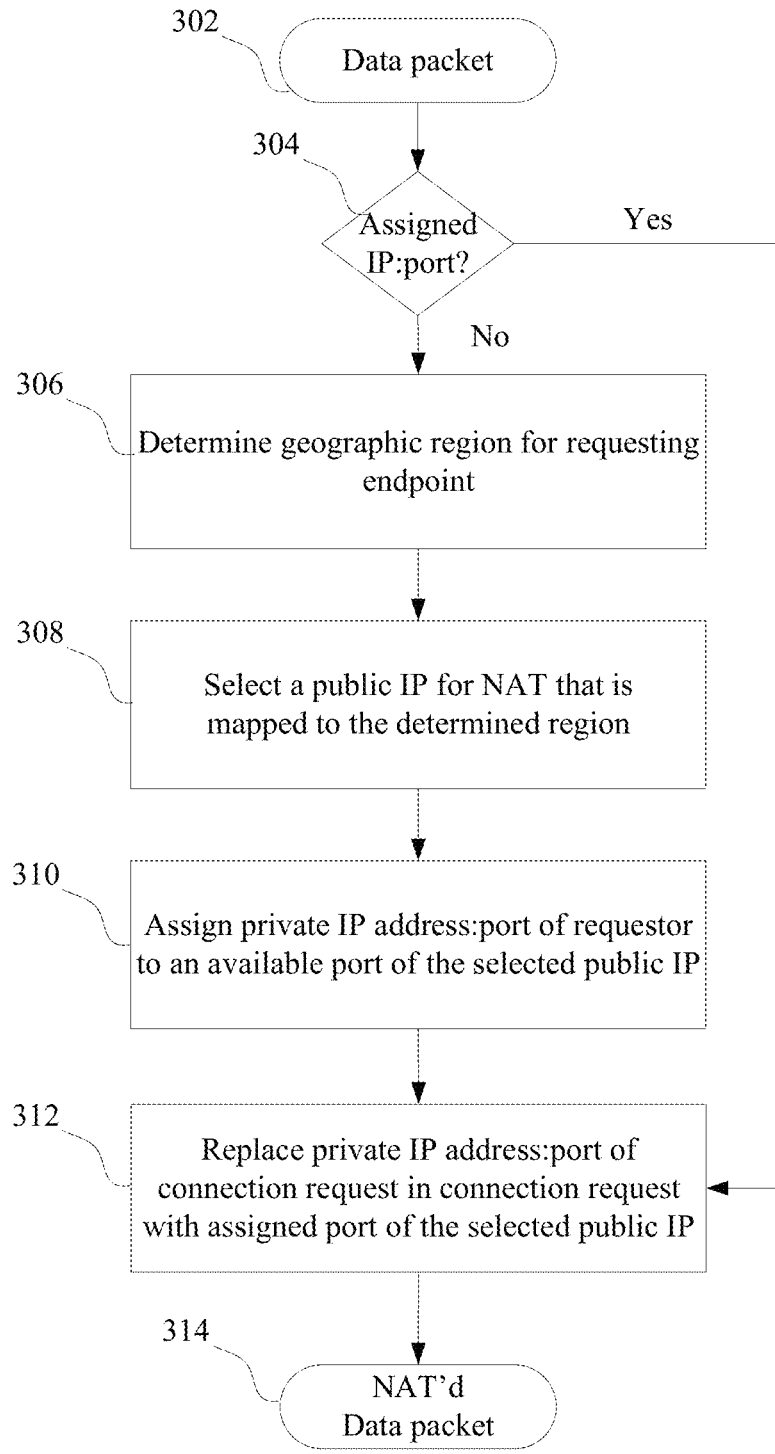
FIG. 3 shows an example process for performing NAT, in accordance with one or more embodiments.

FIG. 3 shows an example process for performing region-based NAT, in accordance with one or more embodiments. The process may be performed, for example, by the region-based NAT 130 in FIG. 1. The process is initiated in response to receiving an outgoing data packet 302 from an endpoint in the private network. At decision block 304, the process determines whether or not the endpoint is already assigned an IP address and port for NAT. If so, the process continues to block 312 for NAT. Otherwise, the process continues to block 306. At block 306, a geographic region of the requesting endpoint is determined. As previously described, the geographic region may be determined, for example, by looking up the geographic region in a stored table mapping the private IP addresses to the geographic regions. In some embodiments, the geographic region for a private IP may be determined according to an algorithmic function. For example, the algorithmic function may be similar to that described with reference to that may be used to indicate a mapping of geographic regions to public IP address. Alternatively or additionally, the geographic region may be determined from metadata included in the data packet. At block 308, a public IP address mapped to the determined geographic region is selected for NAT. At block 310, an available port of the selected IP address is assigned for NAT. At block 312, NAT is performed by replacing the private IP address and port in the original data packet with the selected address and assigned port, to produce a NAT'd data packet 314. For a data packet communicated from the public network to the endpoint in the private network, NAT replaces the public IP address and assigned port in the data packet with the IP address and port associated with the public IP address and assigned port at the NAT circuit.

Figure 4:
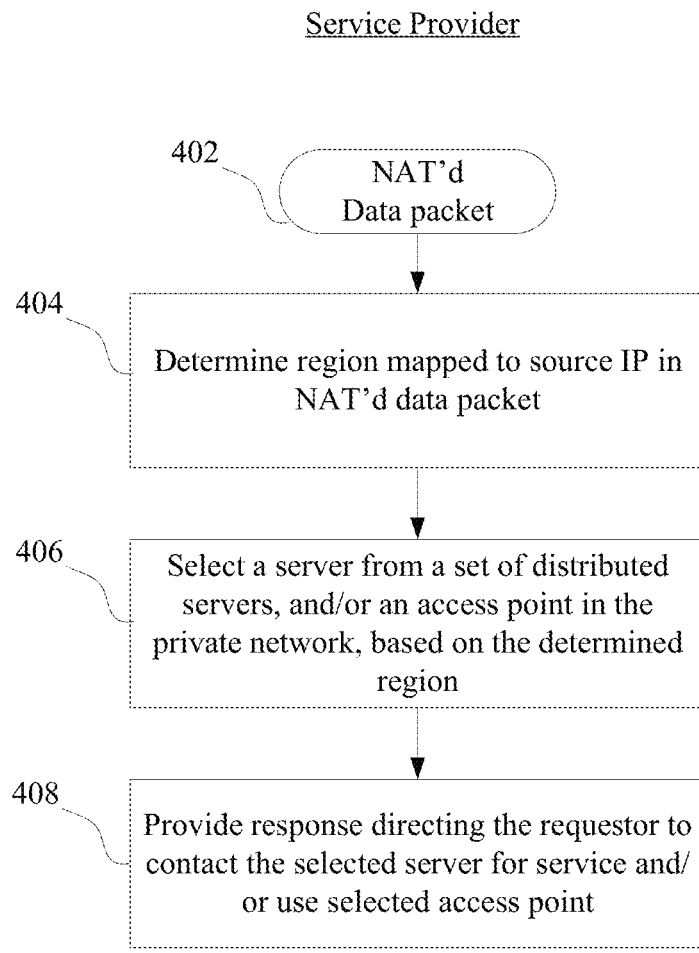
FIG. 4 shows an example process for location-based routing of data in a private network according to a mapping of the public IP addresses used for NAT of the private IP addresses in the private network.

FIG. 4 shows an example process for location-based routing of data in a private network according to a mapping of the NAT'd IP addresses to private IP addresses in the private network. The process may be performed, for example, by the sever 110 in FIG. 1. The process is initiated in response to receiving a NAT'd data packet 402 including a connection request from an endpoint in a private network (e.g., 150).

At block 404, a geographic region mapped to the NAT'd source IP in the NAT'd data packet is determined. At block 406, location-based routing is performed. In this example, a server is selected from a set of distributed servers based on the determined geographic region. Additionally or alternatively, an access point in the private network may be selected at block 406 based on the determined geographic region. At block 408, a response is provided to the source IP address and port in the NAT'd data packet 402. The response is forwarded to the endpoint by a NAT translator configured to receive data packets at the IP address. The response directs the endpoint to contact the selected server for the requested service. Alternatively or additionally, the response may direct the requesting endpoint to use the selected access point for contacting the server.

Various blocks, modules or other circuits may be implemented to carry out one or more of the operations and activities described herein and/or shown in the figures. As examples, the Specification describes and/or illustrates aspects useful for implementing the claimed invention by way of various circuits or circuitry using terms such as blocks, modules, device, system, unit, controller, and the like. In these contexts, a "block" (also sometimes "logic circuitry" or "module") is a circuit that carries out one or more of these or related operations/activities (e.g., a call control circuit). For example, in certain ones of the above-discussed embodiments, one or more modules are discrete logic circuits or programmable logic circuits configured and arranged for implementing these operations/activities, as in the blocks shown in the figures. Similarly, it will be apparent that a server (e.g., providing a corresponding software platform) includes a computer processing circuit that is configured to provide services to other circuit-based devices. Moreover, a VoIP endpoint device (or endpoint) is a communication circuit that can include processing circuits which are configured to establish VoIP communication sessions with other devices (e.g., personal computers, IP-enabled mobile phones, and tablet computers). In certain embodiments, such a processing circuit is one or more computer circuits programmed to execute a set (or sets) of instructions (and/or configuration data). The instructions (and/or configuration data) can be in the form of firmware or software stored in and accessible from a memory (circuit), where such circuits are directly associated with one or more algorithms (or processes). The activities pertaining to such algorithms are not limited to the specific flows shown in the flow charts illustrated in the figures (e.g., where a circuit is programmed to perform the related steps, functions, operations, activities, etc.). The flow charts are merely specific detailed examples. The skilled artisan would also appreciate that different (e.g., first and second) modules can include a combination of a central processing unit (CPU) hardware-based circuitry and a set of computer-executable instructions, in which the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored instructions which may be executed by a computer (or other electronic device) to perform these operations/activities. For example, these instructions reflect activities or data flows as may be exemplified in the flow chart. As another example, where the Specification may make reference to a "first [type of structure]", a "second [type of structure]", etc., where the [type of structure] might be replaced with terms such as ["circuit", "circuitry" and others], the adjectives "first" and "second" are not used to connote any description of the structure or to provide any substantive meaning; rather, such adjectives are merely used for English-language antecedence to differentiate one such similarly-named structure from another similarly-named structure (e.g., "first circuit configured to convert . . . " is interpreted as "circuit configured to convert . . . ").

Based upon the above discussion and illustrations, those skilled in the art will readily recognize that various modifications and changes may be made to the various embodiments without strictly following the exemplary embodiments and applications illustrated and described herein. For example, although aspects and features may in some cases be described in individual figures, it will be appreciated that features from one figure can be combined with features of another figure even though the combination is not explicitly shown or explicitly described as a combination. Such modifications do not depart from the true spirit and scope of various aspects of the disclosure, including aspects set forth in the claims.

What is claimed is:

1. An apparatus comprising:
   a first network interface circuit to communicate data over a private local area network using a first set of IP addresses to identify IP-enabled endpoints in the private local area network, the endpoints being located in a plurality of geographic regions;
   a second network interface circuit to communicate data over a public Internet network using a second set of IP addresses to identify the endpoints in the private local area network; and
   a network address translation (NAT) processing circuit communicatively coupled to the first and second network interface circuits to perform region-based NAT including:
      determining, in response to a data packet from a first port of a first IP address of the first set of IP addresses, which of the plurality of geographic regions the endpoint identified by the first IP address is located;
      selecting a second IP address based on the determined geographic region in which the endpoint is located;
      performing NAT using a mapping of the first port of the first IP address to a second port of the second IP address; and
   a first computing server to, in response to receiving a NAT'd data packet from the second network interface circuit:
      determine the geographic region mapped to an IP address specified in a source address of the NAT'd data packet,
      select, based on the determined geographic region, one of a plurality of computing servers and a set of resources for providing data-communications services for the endpoint identified by the first IP address in the private local area network,
      access, via a configuration settings file, certain operating parameters of interest that are linked to the provided data-communications services, and
      change the set of resources by adjustment or replacement, based on the certain operating parameters of interest linked to the provided data-communications services and on the selected one of the plurality of computing servers monitoring the certain operating parameters of interest, and
   the NAT processing circuit further to provide, in response to data-communication metrics being related to the certain operating parameters of interest and common to different ones of a plurality of data-communications sessions, a signature for detection of at least one of: additional ones of the plurality of data-communications sessions, and data-communications sessions having data paths that are congested.

2. The apparatus of claim 1, further including a computing processor circuit, communicatively coupled or integrated with the first computing server, to use a machine learning algorithm that evolves based on at least one of: monitoring the certain operating parameters of interest; and adjustment or replacement of the set of resources.

3. The apparatus of claim 1, wherein the set of resources are dynamically selected or adjusted while providing the data-communications services for the endpoint identified by the first IP address in the private local area network.

4. The apparatus of claim 1, wherein the first computing server is to monitor the certain operating parameters of interest and, in response, improve the certain operating parameters of interest.

5. The apparatus of claim 1, further including a database including a settings file that is to provide the first computing server access to certain operating parameters of interest, wherein the first computing server is to adjust or replace the set of resources based on a settings file that stores the certain operating parameters of interest.

6. The apparatus of claim 1, wherein the first computing server is to adjust or replace the set of resources based on a trial settings selection algorithm which uses differently-weighted ones of the certain operating parameters of interest in an attempt to improve performance of the provided data-communications services.

7. The apparatus of claim 6, wherein in response to an indication of the trial settings selection algorithm being effective in causing an improvement of the performance, the differently-weighted ones of the certain operating parameters of interest are used to replace a current settings selection corresponding to the set of resources.

8. The apparatus of claim 1, wherein the set of resources includes certain data paths and access points selected to provide a requested service to the endpoint for routing data in a communications session involving the endpoint, and wherein the first computing server is to use a set of criteria for selecting the set of resources, wherein the set of criteria includes, for the communications session, at least two of the following: transmission characteristics in at least one of the public Internet network and the private local area network, traffic load of available access points, and traffic load of available servers.

9. The apparatus of claim 1, further including a user interface circuit to send an input query that requests that a processing circuit, communicatively coupled to the first computing server, is to analyze the data-communication metrics for selecting or monitoring the certain operating parameters of interest.

10. The apparatus of claim 1, further including a processing circuit, communicatively coupled to the first computing server, to analyze the data-communication metrics used for the monitoring of the certain operating parameters of interest, wherein the data-communication metrics are selected based on an input query that the NAT processing circuit is to filter data metrics to identify data-communications metrics having a determined quality that is below a threshold specified in the input query.

11. The apparatus of claim 1, further including a processing circuit, communicatively coupled to the first computing server, to identify the data-communication metrics having a determined quality that is below a threshold specified in an input query, wherein in response to the data-communication metrics being common to different ones of the plurality of data-communications sessions, the NAT processing circuit is to provide the signature for detection of additional ones of the plurality of data-communications sessions.

12. The apparatus of claim 1, further including a processing circuit, communicatively coupled to the first computing server, to identify the data-communication metrics having a determined quality that is below a threshold specified in an input query, wherein in response to the data-communication metrics being common to different ones of the plurality of data-communications sessions, the NAT processing circuit is to provide the signature for detection of data-communications sessions having data paths that are congested.

13. The apparatus of claim 1, wherein the NAT processing circuit is to assign the endpoints in the private local area network to respective ones of the plurality of geographic regions, and the first computing server is to, in response to determining the geographic region mapped to the IP address specified in the source address of the NAT'd data packet,
   determine transmission characteristics of data paths through a plurality of access points; and
   select, based on the determined transmission characteristics, one of the access points for responding to the NAT'd data packet, and wherein the private local area network includes one of among a plurality of access points for which the NAT processing circuit is to perform NAT using at least one IP address exclusively for NAT of data packets communicated via the access point.

14. The apparatus of claim 1, wherein the first computing server is to respond to an input query concerning at least one of the endpoints by reporting on at least one trend concerning status or use of the data-communications services.

15. The apparatus of claim 1, wherein the first computing server is to respond to an input query concerning at least one of the endpoints by reporting on at least one trend to identify, via metrics that exhibit a correlation with said at least one trend, concerning status or use of the data-communications services.

16. A method comprising:
   communicating data, via a first network interface circuit, over a private local area network using a first set of IP addresses to identify IP-enabled endpoints in the private local area network, the endpoints being located in a plurality of geographic regions;
   communicating data, via a second network interface circuit, over a public Internet network using a second set of IP addresses to identify the endpoints in the private local area network; and
   performing region-based NAT, via a network address translation (NAT) processing circuit communicatively coupled to the first and second network interface circuits, and including:
      determining, in response to a data packet from a first port of a first IP address of the first set of IP addresses, which of the plurality of geographic regions the endpoint identified by the first IP address is located;
      selecting a second IP address based on the determined geographic region in which the endpoint is located;
      performing NAT using a mapping of the first port of the first IP address to a second port of the second IP address; and
   via a first computing server and in response to receiving a NAT'd data packet from the second network interface circuit:
      determining the geographic region mapped to an IP address specified in a source address of the NAT'd data packet,
      selecting, based on the determined geographic region, one of a plurality of computing servers and a set of resources for providing data-communications services for the endpoint identified by the first IP address in the private local area network,
      accessing, via a configuration settings file, certain operating parameters of interest that are linked to the provided data-communications services, and
      changing the set of resources by adjusting or replacing, based on the certain operating parameters of interest linked to the provided data-communications services and on the selected one of the plurality of computing servers monitoring the certain operating parameters of interest; and
   providing, in response to data-communication metrics being related to the certain operating parameters of interest and common to different ones of a plurality of data-communications sessions, a signature for detection of at least one of: additional ones of the plurality of data-communications sessions, and data-communications sessions having data paths that are congested.

17. The method of claim 16, further including processing an input query requesting that the processing circuit analyze a set of data metrics for particular parameters of interest, wherein the particular parameters of interest include at least one of: identifiers for specific ones of the set of data metrics, and a set of criteria for identifying subsets of the set of data metrics.

18. The method of claim 16, wherein the first computing server responds to an input query concerning at least one of the endpoints by reporting on at least one trend concerning status or use of the data-communications services.

19. The method of claim 16, wherein the first computing server responds to an input query concerning at least one of the endpoints, the input query requesting identification of data metrics that are exhibiting a trend in comparison to a historical average value.

20. The method of claim 16, wherein the first computing server responds to an input query concerning at least one of the endpoints, the input query requesting identification of one or more data metrics that are exhibiting a trend, and wherein the trend is based on deviation of a value of the one or more data metrics in a recent time window from a calculation linked to a previous less-recent time window.

21. The method of claim 16, wherein the first computing server responds to an input query concerning at least one of the endpoints, the input query requesting identification of one or more data metrics that are exhibiting a particular trend, and wherein the particular trend is used to identify other data metrics that exhibit a strong correlation with the particular trend.

22. The method of claim 16, further including providing alert messages, to one or more users or to a network administrator, in response to the data metrics or analysis satisfying a set of alert criteria or indicating that a network resource is non-functional.

23. The method of claim 16, further including, in response to certain of the geographic regions becoming unbalanced, redefining the geographic regions to divide one or the geographic regions into multiple smaller geographic regions.

24. An apparatus comprising:
- a first network interface circuit to communicate data over a private local area network using a first set of IP addresses to identify IP-enabled endpoints in the private local area network, the endpoints being located in a plurality of geographic regions;
- a second network interface circuit to communicate data over a public Internet network using a second set of IP addresses to identify the endpoints in the private local area network; and
- a network address translation (NAT) processing circuit communicatively coupled to the first and second network interface circuits to perform region-based NAT and including:
  - determining, in response to a data packet from a first port of a first IP address of the first set of IP addresses, which of the plurality of geographic regions the endpoint identified by the first IP address is located;
  - selecting a second IP address based on the determined geographic region in which the endpoint is located;
  - performing NAT using a mapping of the first port of the first IP address to a second port of the second IP address; and
- a first computing server to, in response to receiving a NAT'd data packet from the second network interface circuit:
  - determine the geographic region mapped to an IP address specified in a source address of the NAT'd data packet,
  - select, based on the determined geographic region, one of a plurality of computing servers and a set of resources for providing data-communications services for the endpoint identified by the first IP address in the private local area network,
  - access, via a configuration settings file, certain operating parameters of interest that are linked to the provided data-communications services, and
  - change the set of resources by adjustment or replacement, based on the certain operating parameters of interest linked to the provided data-communications services and on the selected one of the plurality of computing servers monitoring the certain operating parameters of interest, and
- wherein the private local area network includes one of among a plurality of access points for which the NAT processing circuit is to perform NAT using at least one IP address exclusively for NAT of data packets communicated via the access point.

* * * * *